United States Patent [19]
van Deursen et al.

[11] 4,094,203
[45] June 13, 1978

[54] INFINITELY VARIABLE DRIVE METHOD AND APPARATUS

[75] Inventors: Petrus Henricus van Deursen, Deurne; Hemmo Hermannes Johannes Ludoph, Heeze, both of Netherlands

[73] Assignee: Van Doorne's Transmissie B.V., Netherlands

[21] Appl. No.: 765,055

[22] Filed: Feb. 2, 1977

[30] Foreign Application Priority Data

Feb. 9, 1976 Netherlands .................. 7601287

[51] Int. Cl.² ............................................ F16H 55/52
[52] U.S. Cl. ......................................... 74/230.17 F
[58] Field of Search ............................ 74/230.17 F

[56] References Cited
U.S. PATENT DOCUMENTS

| | | | |
|---|---|---|---|
| 3,052,132 | 9/1962 | Dittrich et al. | 74/230.17 F |
| 3,280,649 | 10/1966 | Bruet | 74/230.17 F |
| 3,600,960 | 8/1971 | Karig et al. | 74/230.17 F |

FOREIGN PATENT DOCUMENTS 686,344  5/1964  Canada .................. 74/230.17 F

*Primary Examiner*—Leonard H. Gerin
*Attorney, Agent, or Firm*—Weingarten, Maxham & Schurgin

[57] ABSTRACT

Method and apparatus for driving an apparatus by means of a drive motor and an infinitely variable transmission comprising an endless transmission member running on at least two V-shaped pulleys having conical sheaves spaced apart a distance controlled hydraulically by means of a pump, which provides the necessary fluid pressure for control of the transmission ratio. According to the invention means are provided for ensuring that the transmission member is tensioned before, and so long as, the transmission is mechanically loaded, using one and the same drive motor. This is achieved by driving the pump by the drive motor and providing a clutch between the drive motor and the transmission, which is hydraulically operated by means of fluid provided by the pump, so that the clutch does not connect the drive and the transmission unless there is sufficient fluid pressure for the transmission to function.

3 Claims, 1 Drawing Figure

U.S. Patent    June 13, 1978    4,094,203
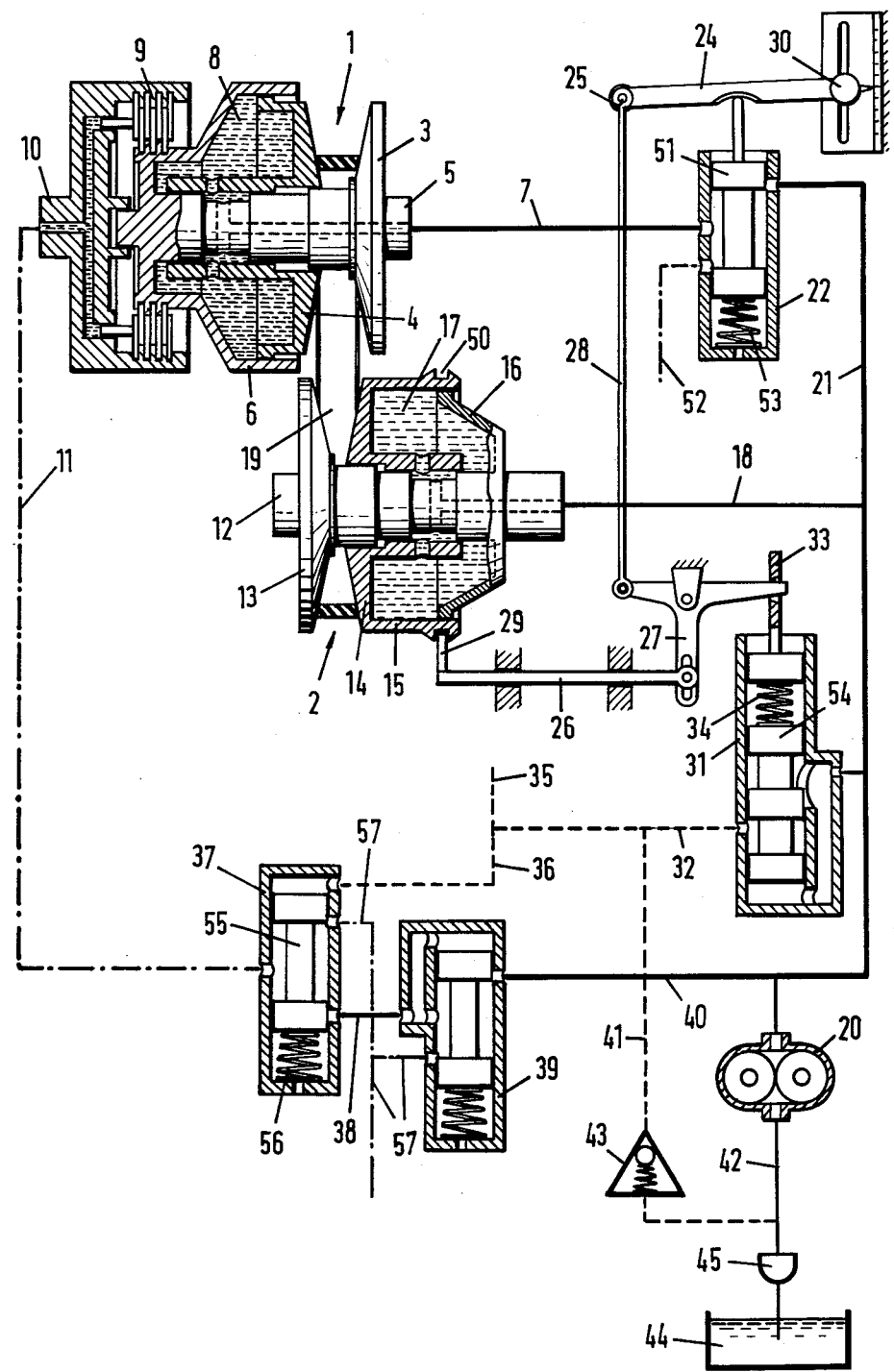

INFINITELY VARIABLE DRIVE METHOD AND APPARATUS

The present invention relates to a method of driving an apparatus by means of a drive motor and an infinitely variable transmission with an endless transmission member running on at least two V-shaped pulleys, the mutual distances of the conical sheaves of which are hydraulically adjustable, while hydraulic fluid for controlling the transmission ratio is provided by means of a pump.

Such a drive requires the presence of sufficient hydraulic fluid under pressure for controlling the variable transmission before the transmission is mechanically loaded. Should the variable transmission be mechanically loaded before the conical sheaves of the pulleys are moved toward one another, the transmission will be damaged.

In order to build up a fluid pressure before the variable transmission is loaded by the drive motor, the pump for delivering the hydraulic fluid for controlling the transmission ratio can be driven with a separate motor, which is started before the drive motor and stopped later than the drive motor. A drawback of the separate motor for driving the pump is the risk that this motor will become inoperative prematurely, for example due to a defect, which may damage the variable transmission. Even if in case of a fluid drop the drive motor stops, the transmission will be loaded for some time owing to the running out of the drive motor or the driven apparatus as a result of the mass inertia.

It is an object of the present invention to avoid this drawback and to provide an infinitely variable driving method in which, with a relatively simple construction and in a reliable way, always fluid pressure is present to control the variable transmission so long as it is mechanically loaded.

To this end, according to the invention, the pump is driven by the drive motor and there is provided between the drive motor and the variable transmission a clutch which is hydraulically operated by means of fluid provided by the pump, which fluid is controlled by a reducing valve and a valve controlled in dependence on the pressure of the fluid delivered by the pump. As a result, after starting the drive motor initially only the pump is driven, whereas the variable transmission is de-clutched from the drive motor. As soon as a sufficiently high fluid pressure is built up in the hydraulic system for the control of the variable transmission, the clutch is fed by means of a control valve with fluid delivered by the pump, which fluid is accurately maintained at a predetermined optimum pressure for the clutch by means of a reducing valve. When the drive motor is stopped the pump will no longer deliver fluid, as a result of which the fluid pressure in the control mechanism for the variable transmission will start dropping. The drive is thereby de-clutched by means of the control valve, while some fluid pressure will remain present for some time, which is necessary during the running out of the apparatus driven by the drive.

Preferably, according to the invention, the pressure of the fluid provided by the pump is controlled by an overflow valve and the control valve is opened when fluid is discharged to some extent through the overflow valve. When the overflow valve starts opening, which means that sufficient fluid pressure has been built up by the pump, fluid is discharged through the overflow valve, so as to build up a specific, relatively low pressure. This fluid pressure can be used to open a control valve, so that fluid pressure can be passed to the clutch. The fluid discharged through the overflow valve can also be used to lubricate the drive, so that lubrication takes place before fluid is passed to the clutch, said lubrication having no effect on the pressure built up by the pump. When the drive motor is stopped the fluid pressure will drop, consequently no fluid will be discharged any longer through the overflow valve, while for some time fluid pressure for the control of variable transmission remains present. However, in the discharge pipe of the overflow valve the fluid pressure will rapidly drop in view of the presence of an opening, for example for lubricating, in said pipe. As a result of this pressure drop the clutch is de-clutched by means of the control valve.

In a preferred embodiment the pressure of the control fluid for the variable transmission is controlled in dependence of the transmission ratio. The resulting variation of the pressure delivered by the pump has no adverse effect on the operation of the hydraulically operated clutch owing to the presence of the reducing valve.

The invention further relates to a drive comprising a drive motor and an infinitely variable transmission with an endless transmission member guided on at least two V-shaped pulleys, the mutual distances of the conical sheaves of which are hydraulically adjustable, including a pump for delivering hydraulic fluid for controlling the transmission, which drive is characterized, according to the invention, in that the pump is driven by the drive motor and in that the clutch between the drive motor and the variable transmission is operable by means of the fluid delivered by the pump, which fluid can be passed to the clutch via a reducing valve and a valve controlled by the pump in dependence on the fluid pressure. According to the invention, the pressure of the fluid delivered by the pump can be controlled by means of an overflow valve, the discharge pipe of the overflow valve being connected to the control valve, which control valve is adapted to open above a specific fluid pressure in the discharge pipe of the overflow valve.

In a preferred embodiment of the invention the overflow valve may be adjustable, depending on the transmission ratio of the variable transmission, which adjacent of the fluid pressure of the transmission has no effect on the operating pressure for the clutch owing to the presence of the reducing valve.

The drive according to the invention is particularly suitable for use in an electric motor as drive motor; of course it can also be used in a different type of drive motor.

The invention will now be elucidated in more detail with reference to the drawing showing one embodiment of the drive by way of example.

The drawing shows schematically a variable transmission including pulleys 1 and 2. Pulley 1 includes a conical sheave 3 secured to the input shaft 5 of the transmission and a conical sheave 4, which is axially slidable on said shaft 5. To control the axially movable conical sheave 4 the latter is constructed as a piston in a cylinder 6 secured to shaft 5. Through line 7 fluid can be fed and discharged to cylinder space 8, to move conical sheave 4 axially. Shaft 5 can be connected via a mechanical clutch 9 to a shaft 10, which is connected to the drive motor not shown in the drawing. For the hydraulic control of clutch 9 a supply line 11 is present.

Pulley 2 comprises a conical sheave 13 secured to output shaft 12 and a conical sheave 14 axially slidable on said shaft, which conical sheave is formed integrally with a cylinder 15, which encloses a cylinder space 17 by means of a piston 16 secured to shaft 12, in which space a pressure can be built up for axially moving or exercising an axial force on conical sheave 14. To this end a fluid line 18 is connected to cylinder space 17.

Guided over both pulleys 1 and 2 is an endless transmission member 19.

The drive furthermore comprises a pump 20 which is directly driven by the drive motor (not shown) connected to shaft 10. The fluid delivered by pump 20 directly communicates with cylinder space 17 via lines 21 and 18, so that, depending on the fluid pressure, a pinching force is exercised on the transmission member 19 by conical sheaves 13 and 14. To adjust the transmission ratio, fluid is fed to cylinder space 8 or discharged therefrom by means of a control valve 22.

Control valve 22 has a gate 51 slidable between a position in which fluid is passed from line 21 to line 7 and a position in which fluid is passed from line 7 to liquid discharge line 52 and through said line 52 to reservoir 44. On one side gate 51 is loaded by helical spring 53 and on the other side a force is exerted by lever 24.

The operative transverse surface of cylinder-piston unit 4, 6 is greater than the operative transverse surface of cylinder-piston unit 15, 16, so that in case of the same fluid pressure in cylinder spaces 8 and 17 the pinch force of conical sheaves 3, 4 of pulley 1 is greater than the pinch force of conical sheaves 13, 14 of pulley 2. Transmission member 19 will consequently start running with a greater diameter over pulley 1 and with a smaller diameter over pulley 2. If the position of gate 51 is such that the liquid from the cylinder space 8 is discharged through lines 7 and 52, the diameter of transmission member 19 over pulley 2 will increase and over pulley 1 decrease on account of the fluid pressure maintained in space 17. By maintaining control valve 22 in a certain equilibrium position it is possible to adjust a specific transmission ratio between primary shaft 5 and secondary shaft 12.

Control valve 22 is operated by means of a lever 24, which is mechanically connected at one end to conical sheave 14 in such a manner that if conical sheave 14 moves axially the end 25 of lever 24 is moved. To this end a rod mechanism 26, 27, 28 is provided, of which rod 26 is provided with a part 29 cooperating with a groove 50 formed on cylinder 15, which is integrally connected to conical sheave 14. Upon displacement of conical sheave 14, rod 26 will move, just as a lever 27, which lever moves the end 25 of lever 24 via a rod 28. By displacement of the other end 30 of lever 24 the transmission ratio of the transmission can be adjusted. If said end 30 is moved in a specific position, fluid will be fed to or discharged from cylinder space 8 by means of valve 22 till a stable equilibrium situation is obtained in which no fluid is transported through line 7 and consequently the volume of cylinder space 8 remains constant.

To control the pressure of the fluid provided by the pump 20 a control valve 31 is provided, which is constructed as an overflow valve. Valve 31 is provided with a control slide 54 which on one side (in the drawing the lower side) is loaded by the fluid pressure in line 21 and on the other side by helical spring 34. If sufficient pressure is present in line 21, overflow valve 31 will discharge fluid through line 32. The fluid pressure in line 21 depends on the transmission ratio, because overflow valve 31 is adjusted in dependence of the axial position of conical sheave 14 of pulley 2 via rod mechanism 26, 27, 33 and helical spring 34. In discharge line 32 of overflow valve 31 a pressure is built up which is, of course, lower than the pressure in line 21. Owing to this it is possible to lubricate the transmission via line 35 and to control a valve via line 36, which valve can feed fluid via line 11 to clutch 9. If the fluid pressure in line 36 is sufficient, control valve 37 will form a connection between line 11 and line 38, in which latter line the accurately determined pressure controlled by means of reducing valve 39 is present, which pressure is optimal to operate clutch 9. Control valve 37 includes a gate 55 loaded on one side by a helical spring 56 and on the other side by the fluid pressure in line 36. The reducing valve 39 is fed via line 40 with fluid from line 21, which fluid is pressurized for optimal operation of clutch 9. Reducing valve 39 and control valve 37 include a fluid discharge line 57 through which fluid can be discharged to reservoir 44. Moreover a line 41 is present through which fluid can be discharged from line 32 to supply line 42 of pump 20. In conduit 41 is disposed a spring-loaded non-return valve 43. The pressure at which non-return valve 43 opens should of course be greater than the pressure necessary to operate control valve 37.

Moreover a liquid reservoir 44 is provided in which several discharge lines terminate and from which fluid is drawn via filter 45 by means of pump 20.

The operation of the apparatus is as follows. If the drive motor not shown in the drawing is started, it will drive both shaft 10 and pump 20. Clutch 9 is thereby declutched. Pump 20 builds up a pressure in line 21, which pressure also prevails in cylinder space 17 and depending on the position of gate 51 of control valve 22 in cylinder space 8. Owing to the fluid pressure in cylinder space 17, conical sheave 14 is moved towards sheave 13 of pulley 2, as a result of which transmission member 19 is tensioned.

As soon as transmission member 19 has reached the required tension, the fluid pressure in line 19 has reached the desired value and overflow valve 31 will discharge fluid through line 32. The required pinch force which conical sheaves 13, 14 of pulley 2 have to exercise to effect the required tension of transmission member 19 depends on the size of the arc of contact of pulley 2 and transmission member 19 and consequently on the actual transmission ratio of the transmission. This transmission ratio is converted via part 29, rod mechanism 26, 27, 33 into a certain precompression of spring 34 of overflow valve 31.

After the required fluid pressure is present in line 21, fluid will be passed via overflow valve 31 to line 32. By this first of all the variable transmission is lubricated at the desired positions via line 35. If the fluid supply to line 32 is sufficient, a pressure will be built up in said line 32 to open control valve 37 at a certain value. This opening takes place, therefore, after both the control for the transmission of fluid pressure is provided and the lubricant is fed to the desired places.

In the embodiment described above the operation of gate 51 of control valve 22 is such that depending on position of end 30 of lever 24 a specific transmission ratio is adjusted. The operation of gate 51 can be effected in any desired way, however. The position of gate 51 can depend on the comparison of a desired (adjusted) value with a value measured in the apparatus, such as the transmission ratio (in the embodiment), the speed (of shaft 12), etc., and on the comparison of a desired value with a value measured outside the apparatus, such as performance made by the driven apparatus. Gate 51 can also be operated electromagnetically, for example by means of an electronically calculated signal.

We claim:

1. A transmission assembly for transmitting a torque from a drive motor to a driven apparatus, with an infinitely variable transmission ratio, comprising:

an input shaft adapted to receive the output of the drive motor, first and second V-shaped pulleys, a hydraulically operable clutch, the clutch being operatively connected to transmit torque between the input shaft and the first pulley, an output shaft, the output shaft being connected to the second pulley, an endless transmission member or belt wound around the first and second pulleys, each of said pulleys comprising a pair of facing, conical pulley halves, assembled for rotation about a common axis, means associated with each of the first and second pulleys for adjusting the distances between the respective pulley halves thereof, said adjusting means being responsive to hydraulic fluid pressure, a pump for supplying hydraulic fluid under pressure to control said adjusting means, the pump being driven by the input shaft, a hydraulic control line operatively connected between the pump and the clutch for supplying hydraulic fluid to the clutch to effectuate clutch operation, a reducing valve, and a control valve operable in response to the fluid pressure supplied thereto, the reducing valve and control valve being operatively connected to the hydraulic control line to control the pressure of the fluid supplied to the clutch, whereby the clutch is engaged and the transmission driven only when the belt wound around the pulleys is tensioned by means of sufficient fluid pressure and the clutch is disengaged, in the absence of sufficient fluid pressure, disconnecting the drive motor from the transmission.

2. The apparatus of claim 1, further comprising an overflow valve adapted to control the pressure of the fluid supplied by the pump, the overflow valve having a discharge line thereof connected to the control valve, and the control valve being operable to open when the fluid pressure in the discharge line of the overflow valve exceeds a predetermined level.

3. The apparatus of claim 2, wherein the flow through the overflow valve varies in response to the transmission ratio.

* * * * *